Jan. 9, 1940.   J. A. PARSONS   2,186,881
MOLDING CASEIN AND SIMILAR PLASTICS
Filed March 17, 1937
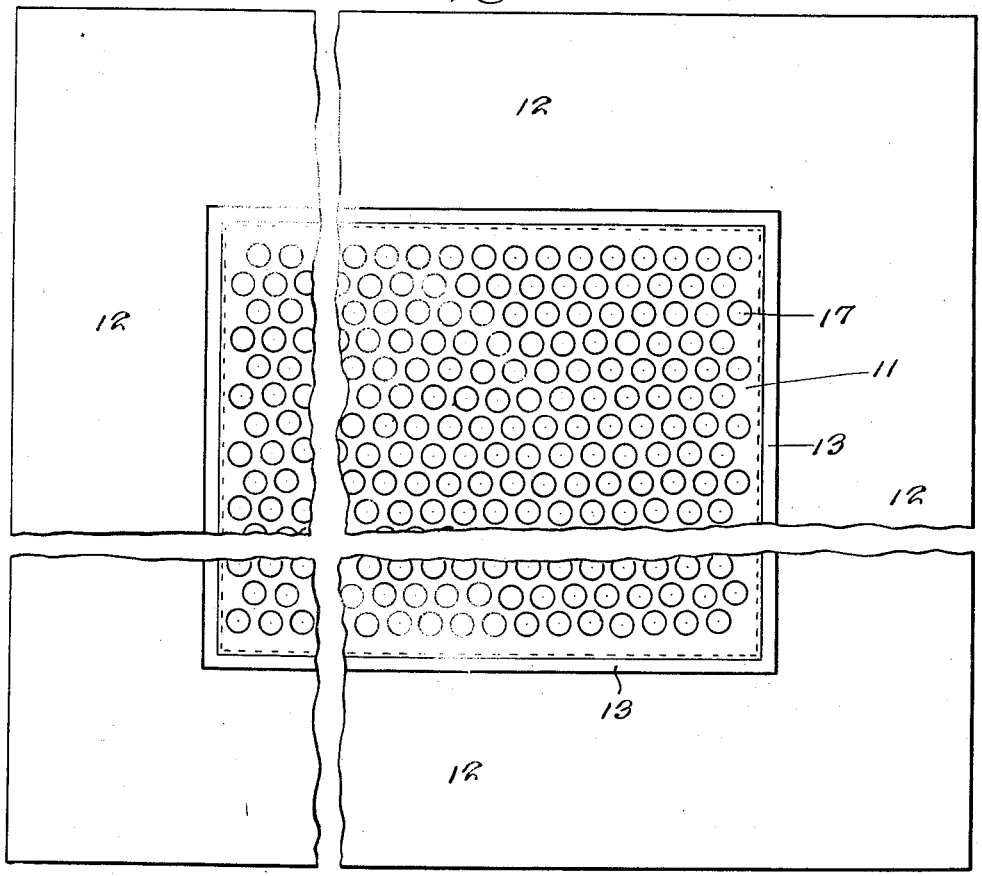
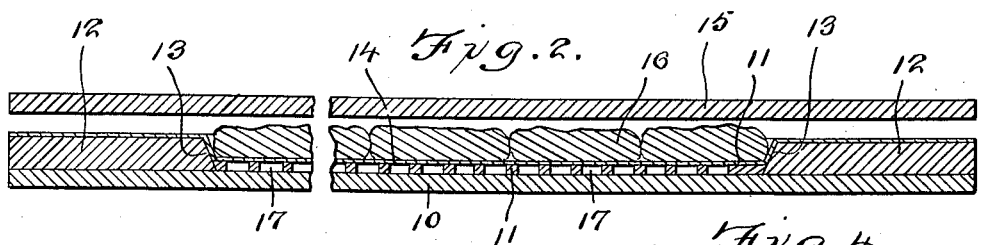
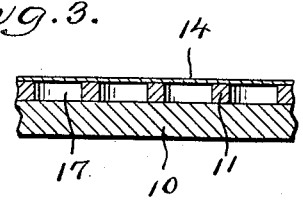
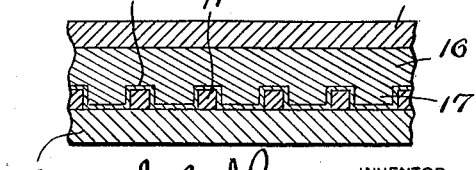
INVENTOR
John A Parsons
BY Foster & Cohen ATTORNEYS

UNITED STATES PATENT OFFICE 2,186,881

MOLDING CASEIN AND SIMILAR PLASTICS

John A. Parsons, Bainbridge, N. Y.

Application March 17, 1937, Serial No. 131,537

2 Claims. (Cl. 18—48)

The present invention relates to the manufacture of molded casein plastics, which may contain pigments or dyes if desired, and has for its object to produce certain economies in the process.

Heretofore where it was desired to make molded casein plastics having a patterned surface, the practice has been to form a mold the bottom plate of which, and also if desired the cover plate of which, had been carved or etched, in such a way as to give the desired pattern. It will be appreciated that the production of the plates carrying the design or pattern, which generally had to be produced by expensive hand labor, involved a large amount of expense, inasmuch as the cutting, etching or engraving of the plate had to be done by high paid experts. Furthermore it often happened that the particular design did not find favor with the purchasing public, and accordingly the mold had to be scrapped.

The invention will be described with particular reference to making casein plastics in the form of sheets, having a patterned surface, although it is to be understood that the invention of the present case is applicable in all forms of molded casein plastics. It is furthermore not desired to limit the present invention to the molding of casein plastics because this invention can also be utilized in molding other products, to some extent at least.

I have discovered a new, simple and inexpensive method for producing a great variety of designs on plastic material, particularly casein plastics, although the same idea is capable of being used to some extent at least in molding other plastic material which has sufficient flow under moderate heat and under pressure, but for the purpose of illustration, I shall confine myself to the making of the above mentioned plastic designs with casein. The ordinary practice of the art, as heretofore practiced, is as follows. The well established method for making sheets of casein plastics is as follows: The proper type of casein (preferably a well washed rennet casein) is mixed with a small amount of water, enough to moisten the same (usually about 18 to 50% on the weight of the casein), with or without added coloring matter such as dyes, pigments and the like, to give the desired color. In most cases the so-moistened material is then run through an extruding press, well known in the art of casein plastic manufacture. The material as it comes through the extruding machine (which has been plasticized by the action of the extruding press), may be cut into small pieces, e. g. 6 or 8 or 10 inches long and usually a number of these pieces are placed in a metal mold having a carved or ornamental bottom. The mold is thereafter placed in a hydraulic press, the material pressed and heated (e. g., to about 190–210° F.) to cause the plastic material to flow together and form a uniform sheet which may have a smooth top. The metal mold ordinarily used in making casein plastic sheets consists of a metal plate or bottom of the desired size with a metal frame riveted around or welded onto the edge of the plate and the thickness or depth of this metal frame regulates to some extent at least, the thickness of the resulting sheet of casein plastic material to be made.

The usual procedure in making an ordinary sheet of casein plastic material is to place in the above described mold, a certain amount of casein plastic that has been extruded as described above, or otherwise made homogeneous, and after the pressing operation, to trim the sheet, the sheet is then placed in a weak formaldehyde bath until cured and it is then dried.

In order to carry out my invention I utilize a plain metal mold (i. e., a mold having a plain bottom and plain top), but before putting the casein plastic into the mold I place on the bottom of the metal mold a design which may be composed of metal, hard fibre board, carved wood, wire screens, sandpaper, flat strips of metal, fibre or wood; round strips of the same, oval strips of the same, etc., to give a design overlying the bottom of the mold. I then place on the design a thin sheet of a relatively soft and flexible metal, such as zinc, tin or aluminum, or other suitable material. I then place the casein plastic material on top of the zinc, tin or aluminum. I then place a cover on the mold and place this assemblage in a hydraulic press and apply pressure and heat, all as outlined above, with the result that I obtain various patterns and designs on the bottom side of the sheet of casein plastic material formed thereby. To better illustrate my process I give herewith the annexed drawing.

The said drawing illustrates one form of equipment for carrying out the process of the present invention.

Figure 1 illustrates a plan view of the mold (with the cover removed), and

Figure 2 illustrates the mold and associated pattern sheet, the cover being shown in a raised position.

Figures 3 and 4 show details.

In said drawing, 10 represents a flat plate, on which it is not necessary to produce any etching or carving. A plate 11, having round perforations evenly distributed over its entire area, is laid upon the bottom plate. 12 is a frame, welded or riveted to the bottom plate 10, around the four edges of the same. The inside of this frame can be beveled as shown at 13. 14 represents a thin sheet of flexible material, such as thin sheet zinc, although other materials such as aluminum can be employed. This sheet may have conveniently a thickness of about 0.1 inch to .04 inch. The molding may be done at 190 to 200 or 210° F.

*Example 1.*—The casein plastic mass is placed upon this thin metal sheet 14, after which a cover plate 15 is lowered into position, and the assemblage is then placed in a hydraulic press and heated and pressed. The pressure forces the thin metal sheet down into the holes in the plate 11, thereby giving the pattern on the bottom surface of the casein plastic sheet. It will be understood that where desired, another sheet of thin metal and another plate 11 can be placed on top of the casein plastic mass in the mold, before pressing, in order to give a casein plastic sheet with the top and bottom patterned.

In Figure 2 of the drawing, I have shown at 16—16, a number of pieces of extruded moistened casein, sufficient for a molding operation in this mold. Upon pressing down the plate 15, and heating, as above mentioned the several pieces flow together into one mass, and small portions flow downwardly into the holes 17 in the plate 11, giving the desired configuration to the bottom side of the sheet. The metal sheet 14 of course is pressed downwardly by the moistened casein, against the plate 10, thereby forming, on the bottom of the sheet, a series of short cylindrical projections.

The molded sheet, either as such or after cutting up into the respective desired sizes, can be cured in formaldehyde solution and dried, in the usual manner in the art.

I have shown in Fig. 3, a sectional elevation at the beginning of the molding operation, with the sheet 11 shown in Figs. 1 and 2. Fig. 3 showing the metal sheet lying flat upon the sheet 11, and Fig. 4 showing this pressed downwardly into the holes in sheet 11, against the plate 10.

It will be appreciated that after the first molding with a given assemblage of bottom plate 10, sheet 11 (or other sheet) and metal sheet covering, the thin sheet metal will be left in the depressions in the sheet, making it unnecessary to remove the metal sheet each time. This thereby forms, from the plate 11 and the thin metal sheet 14, a substantially permanent mold bottom or face, which can be thereafter used for many moldings. The molded casein plastic does not adhere to the metal sheet, but is simply lifted out of the mold.

*Example 2.*—Instead of the perforated plate 11, shown in the drawing, I can use a sheet of coarse sandpaper, laid in the bottom on the mold, with the sanded side up, and over this is placed a sheet of thin metal 14 is above described. The extruded casein plastic is put into the mold as above described, and the cover plate 15 applied, and the mass is then subjected to hydraulic pressure and heat as described above. In this way there is produced a sheet having on its bottom, a roughened surface.

*Example 3.*—The design effect on another molded sheet was made by the same method as described in Example 1, but a sheet of perforated material with oblong rounded perforations was substituted for the sandpaper described in Example 2.

*Example 4.*—The method and procedure was the same as in Example 1, with the exception that a sheet of metal with circular perforations rounded at their bottoms, was substituted for the metal plate 11 and the sheet of metal used was not as thick as in Example 1.

*Example 5.*—The method and procedure was the same as in Example 1, with the exception that wire screening (of nearly ¼ inch mesh) was used in the bottom of the mold in place of the sheet 11.

*Example 6.*—Same as in Example 2, excepting in place of sandpaper, metal with curved serrations was substituted for the sandpaper.

*Example 7.*—Same procedure as in Example 2, but a thin sheet of hammered metal having a design on its top face in the form of hammer dents, was substituted for the sandpaper.

*Example 8.*—Same procedure as in Example 2, excepting that flat strips of metal were substituted for the sandpaper in the bottom of the mold, spaces being left between these strips.

From these examples it will be noted that very excellent designs of many and widely varying patterns can be made very simply and very uniformly by my process and at a very much less cost than has been possible to produce such material in the past. Furthermore, it obviates the necessity of the making and caring for large numbers of various designs of molds, which at best rapidly lose their value due to change in styles of manufactured articles from plastic material.

Aside from using my process on plastic material such as casein plastic, it also may be used in molding Celluloid, phenolic resin compositions, urea resin compositions and the many other plastic materials which flow under heat and pressure, particularly those in which sufficient flow can be obtained at temperatures not over 200° F. to 230° F.

I claim:

1. A method of making a mold surface for molding plastics, which comprises placing upon a bottom plate of a mold, at least one piece of a hard material, separate from the mold itself which piece has a patterned top surface, placing thereupon a thin strong sheet of metal that can distort under pressure, placing a plastic material which can be molded at an elevated temperature not over 200 to 230° F. on such sheet of metal, and subjecting such assemblage to molding pressure and heat to drive said sheet of metal into the depressions in said patterned top surface, said pressure being sufficient to cause molding of said plastic material upon such distorted sheet of metal, and whereby said thin sheet of metal becomes impressed into the pattern of said patterned top surface and whereby said supported thin sheet of metal constitutes the molding surface.

2. A method of making a mold surface for molding plastics which comprises placing a sheet of coarse abrasive material on the bottom of said mold, having its abrasive surface turned away from the mold bottom, placing thereupon a thin strong sheet of a metal that can distort under pressure, placing a plastic material which can be molded at an elevated temperature not over 200–230° F. on said sheet of metal, subjecting such assemblage to molding pressure and heat to drive said sheet metal into the depressions of said coarse abrasive material, said pressure being sufficient to cause molding of said plastic material upon such distorted sheet of metal, and whereby the said distorted sheet of metal becomes impressed into the pattern of said abrasive sheet, whereby said supported thin sheet of metal can be thereafter used as a molding surface.

JOHN A. PARSONS.